(12) United States Patent
Losonczi

(10) Patent No.: US 8,091,315 B2
(45) Date of Patent: Jan. 10, 2012

(54) BUILDING BLOCK COMPRISING LIGHT TRANSMITTING FIBRES AND A METHOD FOR PRODUCING THE SAME

(76) Inventor: Aron Losonczi, Csongrad (HU)

( * ) Notice: Subject to any disclaimer, the term of this patent is extended or adjusted under 35 U.S.C. 154(b) by 664 days.

(21) Appl. No.: 10/513,922

(22) PCT Filed: May 16, 2003

(86) PCT No.: PCT/SE03/00798
§ 371 (c)(1),
(2), (4) Date: Nov. 10, 2004

(87) PCT Pub. No.: WO03/097954
PCT Pub. Date: Nov. 27, 2003

(65) Prior Publication Data
US 2005/0183372 A1   Aug. 25, 2005

(30) Foreign Application Priority Data
May 17, 2002   (SE) ........................ 0201502

(51) Int. Cl.
*E04B 5/04* (2006.01)
*E04C 2/04* (2006.01)
(52) U.S. Cl. .............. 52/596; 52/592.5; 52/604; 52/606
(58) Field of Classification Search ................ 52/720.1, 52/596, 592.5, 592.6, 604, 606, 608; 404/22; 362/576
See application file for complete search history.

(56) References Cited

U.S. PATENT DOCUMENTS

| | | | | |
|---|---|---|---|---|
| 2,162,302 | A * | 6/1939 | Greene | 362/153.1 |
| 3,516,724 | A * | 6/1970 | Ashton, Jr. et al. | 385/143 |
| 4,121,206 | A * | 10/1978 | LeMire | 340/815.42 |
| 4,570,207 | A * | 2/1986 | Takahashi et al. | 362/153.1 |
| 4,830,899 | A * | 5/1989 | Nakahashi et al. | 428/137 |
| 4,845,596 | A * | 7/1989 | Mouissie | 362/560 |
| 4,924,612 | A * | 5/1990 | Kopelman | 40/547 |

(Continued)

FOREIGN PATENT DOCUMENTS

DE       93 10 500.2       7/1993

(Continued)

*Primary Examiner* — Eileen D Lillis
*Assistant Examiner* — Mark Wendell
(74) *Attorney, Agent, or Firm* — Fitch Even Tabin & Flannery; Norman K. Kunitz

(57) ABSTRACT

The present invention relates to a building block (2) comprising embedded light transmitting fibres (6) in a cast material (4), where the fibers are arranged in the cast material from a first lateral surface (8) of the building block to an opposite second lateral surface (10) of the same, whereby a fiber end, respectively, is arranged to end up at a respective position (12) on the first lateral surface (8), and the other end of the fiber is arranged to end up at a respective position (14) on the second lateral surface, whereby the fibers (6), respectively, permits transfer of light through the building block emitted from a light source arranged behind either of the lateral surfaces (8, 10), that the cast material (4) and the embedded fibers (6) therein constitute a building block (2) with a homogeneous structure that can receive load and further that a plurality of fibers (6) are evenly distributed over substantially the whole lateral surface (8, 10), respectively, whereby light can be emitted from the evenly distributed fiber ends in positions (12, 14) over substantially the whole lateral surface. The present invention also relates to a method for producing a building block comprising embedded light transmitting fibers.

14 Claims, 2 Drawing Sheets

U.S. PATENT DOCUMENTS

| | | | | |
|---|---|---|---|---|
| 5,101,325 | A * | 3/1992 | Davenport et al. | 362/628 |
| 5,160,202 | A * | 11/1992 | Legare | 362/153.1 |
| 5,231,689 | A * | 7/1993 | Reidinger | 385/147 |
| D376,657 | S * | 12/1996 | Bohn | D25/113 |
| 5,683,170 | A * | 11/1997 | Blaha | 362/145 |
| 5,943,827 | A * | 8/1999 | Okerlund | 52/28 |
| 6,082,886 | A * | 7/2000 | Stanford | 362/576 |
| 6,123,443 | A * | 9/2000 | Conway | 362/576 |
| 6,231,206 | B1 * | 5/2001 | Hervey et al. | 362/153 |
| 6,234,657 | B1 * | 5/2001 | Shih | 362/559 |
| 6,398,399 | B1 * | 6/2002 | Neophytou | 362/576 |
| 6,547,589 | B2 * | 4/2003 | Magyar et al. | 439/535 |
| 6,605,343 | B1 * | 8/2003 | Motoi et al. | 428/298.1 |
| 6,976,765 | B2 * | 12/2005 | Helenowski | 362/147 |
| 7,204,629 | B2 * | 4/2007 | Pipo et al. | 362/559 |
| 7,556,394 | B2 * | 7/2009 | Patti | 362/153.1 |
| 2003/0026537 | A1 * | 2/2003 | Hamanaka | 385/33 |
| 2004/0032748 | A1 * | 2/2004 | Trudeau et al. | 362/554 |
| 2004/0213020 | A1 * | 10/2004 | Gotfried | 362/576 |

FOREIGN PATENT DOCUMENTS

| | | |
|---|---|---|
| FR | 2743135 | 7/1997 |
| GB | 1561142 | 2/1980 |
| JP | S60-115306 | 8/1985 |
| JP | H1-174409 | 12/1989 |
| JP | H3-83213 | 8/1991 |
| JP | H4-288203 | 10/1992 |
| JP | H6-76985 | 10/1994 |

* cited by examiner

FIG. 2A
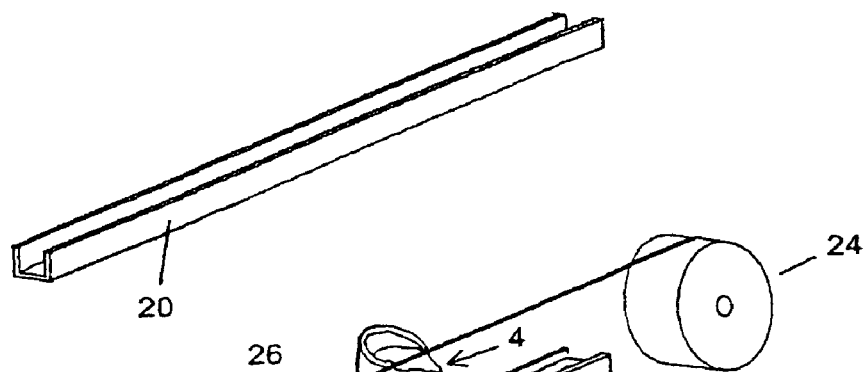
FIG. 2B
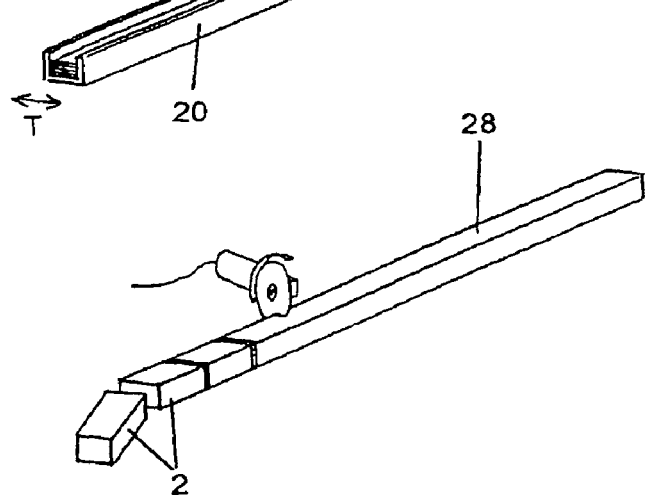
FIG. 2C

BUILDING BLOCK COMPRISING LIGHT TRANSMITTING FIBRES AND A METHOD FOR PRODUCING THE SAME

TECHNICAL AREA

The present invention relates to a building block comprising light transmitting fibres embedded in a cast material. The present invention also relates to a method for producing a building block comprising embedded light transmitting fibres.

BACKGROUND

For practical and decorative reasons it is usually frequent that a building block, such as a wall-, floor- or ceiling-surface is illuminated by one or several separate sources of light, e.g. so called spotlights, directed to the surface in question. Nowadays it is also popular to mount lamps in building elements, such that they are recessed and/or flush with the surface, which provide some lighting over the surface and some lighting in adjoining rooms adjacent to the surface.

From GB 1561142 it is previously known to arrange light guiding bars comprising bundles of optical fibres, in drilled through holes between two opposite sides of a building element. Light from a light source that illuminates a rear side of the element is guided through the bars bundles of fibres to the opposite side.

However, it is impractical, time consuming and costly, as mentioned above, to mount light sources or optical cables in prepared building elements or in built walls, ceilings or floors, in order to transfer light through the building element, especially if small light sources, at certain points, shall be mounted in the building element. If a considerable part of a surface shall emit light, it is easily appreciated that the work will be lengthy since a large number of holes have to be made. Besides, only mounting of a limited number of light sources in the building element can be done by these known methods, if not influencing the length of the element. In case a light emitting and/or illuminating effect is desired to be provided over a considerable part of a surface, when a separate light source cannot or is not desired to be used, it is in practice only possible by mounting relatively light-spreading sources in the surface layer of the building element in order to avoid influencing its strength. Thus, formation of the extent of illumination and the decorative effect becomes restricted.

DESCRIPTION OF THE INVENTION

An object according to the present invention is to eliminate the drawbacks that are associated with the state of the art. Yet an object is to provide prefabricated, load-carrying building elements of traditional elementary material, such as e.g. concrete, and that simultaneously, in itself to certain extent, can let light through over the main part of two of its opposite surfaces and that simultaneously permits an uncomplicated and cost-efficient production.

This object is achieved by a building block comprising embedded light transmitting fibres in a cast material, such as optical fibres or the like, according to the present invention as defined in claim 1, where the fibres are arranged in the cast material from a first lateral surface of the building block to an opposite second lateral surface of the same, whereby a fibre end, respectively, is arranged to end up at a respective position on the first lateral surface, and the other end of the fibre is arranged to end up at a respective position on the second lateral surface, whereby the fibres, respectively, permits transfer of light through the building block emitted from a light source arranged behind either of the lateral surfaces, that the cast material and the embedded fibres therein constitute a building block with a homogeneous structure that can receive load and further that a plurality of fibres are evenly distributed over substantially the whole lateral surface, respectively, whereby light can be emitted from the evenly distributed fibre ends in positions over substantially the whole lateral surface.

An advantage with this solution according to the invention is that a prefabricated light transmitting building block is provided. By means of the fibre ends that ends up at the lateral surface according to the invention, it is thus possible to achieve light sources at certain spots evenly spread over substantially the whole lateral surface, which provides a feeling that the whole lateral surface is illuminated, alternatively is emitting light. Yet an advantage is that the light transmitting fibres are wholly integrated with the cast material, whereby the strength of the building block is insufficiently influenced. The building block according to the present invention presents a homogeneous structure with the capability to receive large loads.

The present invention relates also to a method for producing of a building block comprising embedded light transmitting fibres in a cast material, such as optical fibres or the like, which fibres permits transfer of light from one lateral surface of the building block to an opposite lateral surface of the same, comprising the following steps; adding of a cast material in an elongated mould in a first step, arranging of a layer of fibres in the mould in a second step, which layer constitute of a plurality of parallel arranged fibres, subjecting the mould to a mechanical pressure and/or vibration in a third step such that the layer of fibres is permitted to sink into the cast material to a desired depth, repeating first to third steps, alternatively second to third step, until the mould is filled with the cast material and a plurality of fibre layers, whereby the cast material is permitted to become solidified and form a homogeneous body, and partition of the solidified, moulded body into building blocks by cutting, such that the respective ends of the fibre layers ends up at a lateral side, respectively, of the building block.

The light transmission of the building block works both with natural and artificial light. Preferably use is made of light transmitting fibres such as glass fibres, optical fibres, fibres of transparent plastics or the similar. The fibre thickness can be in the order of from some tenth part millimetres up to a few millimetres. The luminous transmittance of the building block depends on the number of fibres, but may Suitably be about $1/10$, i.e. a tenth part of the light that illuminates one side of the building block is emitted by the fibres to the other side of the block.

The cast material can be of concrete, cement, gypsum, plastics, metal or the like. Suitably use is made of concrete or cement that provides an average density of the prepared building block within the range from about 2200 kg/m$^3$ up to about 2400 kg/m$^3$. The number of fibres per building block can be in the range from some hundred up to some thousand. The volume relation of the cast material and fibres is preferably within the range from about 1:15 up to about 1:8. A suitably dimension of a building block produced by the method according to the present invention is e.g. 250 mm/120 mm/68 mm, which has a weight of about 5 kg and a concrete/fibre relation of 1:13.

DESCRIPTION OF THE DRAWINGS

The present invention will now be described more in detail by way of examples, with reference to the accompanying drawings, without limiting the interpretation of the invention thereto, where FIG. 2a-C shows in a schematic drawing various steps of a production method of a building block according to the present invention.

DETAILED DESCRIPTION OF EMBODIMENTS

Figure 1A:
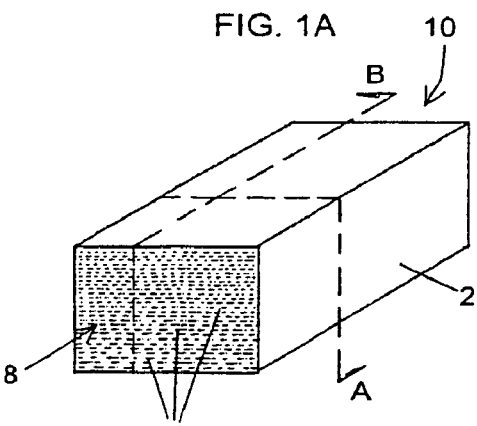
FIG. 1 shows in a perspective view at an angle from above of a building block according to the invention.
FIG. 1B shows a cross-section A-A of the building block in FIG. 1A.
FIG. 1C shows a longitudinal section B-B of the building block in FIG. 1A.
FIG. 1D shows a partially perspective view of a wall built of a number of building blocks according to FIG. 1A.
Figures 1B, 1C:
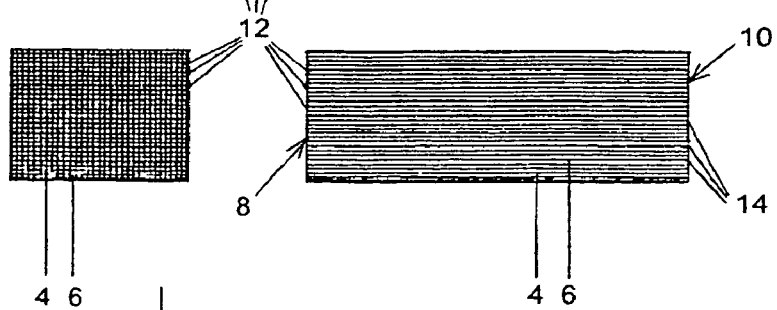

A building block 2 according to the invention is shown in FIGS. 1A-C. The building block comprises a cast material 4 and embedded light transmitting fibres 6 in the cast material. The fibres are arranged in the cast material from a first lateral surface 8 of the building block to an opposite second lateral surface 10. One end of a fibre 6, respectively, is arranged to end up at a position 12 at the first lateral surface 8 and the other end of the fibre is arranged to end up at a position 14 on the second lateral surface 16. Pluralities of fibres 6, suitably some hundred single fibres, are arranged in parallel in the longitudinal direction L of the building block. The fibres are evenly spread in the block 2 and the ends of the fibres thus ends up at the lateral surfaces in positions 12, 14 over substantially the whole lateral surface 8, 10, respectively. The fibres permits that light is transferred through the building block emitted from a light source arranged e.g. behind the second lateral surface 10, to the first lateral surface 8, or vice versa, whereby light is emitted from the evenly distributed fibre ends in positions over substantially the whole lateral surface.

Figure 1D:
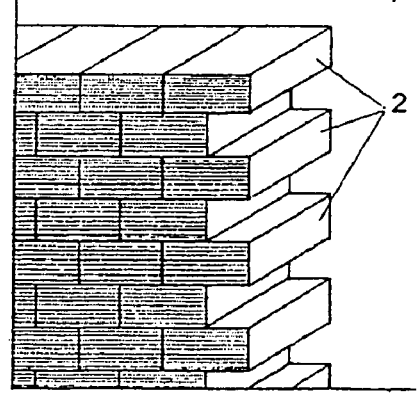

In that fibres are evenly distributed in the block 2 and that the cast material substantially surrounds respective fibre as evident in FIGS. 1A-C, the block forms a homogeneous structure with high strength. Load-bearing walls of desired size and extension could thereby easily be constructed with a number of integral building blocks 2 as is evident from FIG. 1D.

In FIGS. 2A-C is shown a production method according to the present invention, for production of a building block 2 according to the invention as described above. In an elongated mould 20 (see FIG. 2A) of e.g. steel or wood, is in a first step a cast material 4 added. In a second step is a layer 22 of fibres 6 arranged in the longitudinal direction of the mould 20. In a third step, the mould is subjected to a mechanical pressure and/or vibration such that the fibre layer is permitted to sink into the cast material to a desired depth. Then, steps one to three is repeated, alternatively steps two to three, until the mould is filled with the cast material and several fibre layers. Each layer 22 constitutes of a plurality of parallel fibres 6, for example some twenty fibres or more per layer. The thickness of the layer and the fibres may suitably be about 1 mm and the number of layers can be some twenty or more. The fibre layers 22 are fed continuously in the mould 20 from a fibre roll 24 via a nozzle 26 that provides for an even distribution of the fibres along the whole, transverse direction T of the mould. When the cast material 4 has become solidified, the solid moulded body 28 is divided by cutting into separate building blocks 2, e.g. with the dimension 250 mm/120 mm/68 mm. The cutting is done such that the ends of the fibre layers 22, respectively, end up at a lateral surface 8, 10, respectively, of the building block 2.

The invention claimed is:

1. A building block made of a cast material, comprising: a first outer lateral surface, an opposite second outer lateral surface, a length extending between said first and second outer lateral surfaces, and light transmitting fibres, including optical fibres, embedded in the cast material, each of said light transmitting fibres having a first end and a second end. each capable of receiving impinging light from a light source and guiding the light toward an opposite said end, said fibres being arranged in the cast material so that said first ends of said fibres terminate at said first outer lateral surface of the building block and said second ends of said fibres terminate at the opposite second outer lateral surface of the building block, said fibres defining a plurality of generally parallel longitudinal layers extending along said length of the building block, wherein said fibres permit transfer of light through the building block emitted from,a light source arranged behind one of said first and second outer lateral surfaces so that light can be emitted evenly distributed over substantially said opposite outer lateral surface.

2. The building block according to claim 1, wherein each of said fibres has a thickness of some tenth part millimeters to a few millimeters.

3. The building block according to claim 1, further comprising a cast material selected from the group consisting of concrete, cement, or gypsum.

4. The building block according to claim 1 wherein said length extends in the direction of the longitudinal axis of the block so that said lateral surfaces are end surfaces of the block.

5. The building block according to claim 1 wherein the first and second outer lateral surfaces are cut surfaces.

6. The building block according to claim 1, wherein the building block is made by a method including the following steps:

adding of a cast material in an elongated mould in a first step, arranging of a longitudinally extending layer of fibres in the mould in a second step, the layer constituting a plurality of parallel arranged fibres extending along a length of the building block, subjecting the mould to a mechanical pressure and/or vibration in a third step so that the layers of fibres is permitted to sink into the cast material to a desired depth, repeating said first, second, and third steps, alternatively second and third steps, until the mould is filled with the cast material and a plurality of generally parallel longitudinal fibre layers, permitting the cast material to become solidified to form a homogeneous body, and partitioning the solidified, moulded body into building blocks by cutting such that respective ends of the fibre layers terminate at a lateral side, respectively, of the building block.

7. The building block according to claim 6, wherein each generally parallel longitudinal layer has at least twenty fibres.

8. The building block according to claim 6, wherein the method further includes continuously feeding the fibre layers in the mould from a fibre roll via a nozzle to provide an even distribution of the fibres along the, entire transverse direction (T) of the mould.

9. A building block made of a cast material and being able to receive loads, comprising: a length defined between a first lateral surface and an opposite second lateral surface, a width, a height, embedded light transmitting fibres having respective first and second ends, each capable of receiving light from impinging illumination and guiding the light toward another of said first and second ends, said first end of each fibre terminating at said first lateral surface and said second end of each fibre terminating at said second lateral surface and receiving light impinging on the associated respective lateral surface, said fibres defining a plurality of layers so that in each layer, the fibres are evenly spread and extend longitudinally in a direction parallel to each other and fill said width of the building block, wherein said layers fill substantially the entire height of the building block.

10. The building block according to claim 9 wherein said length extends in the direction of the longitudinal axis of the block so that said lateral surfaces are end surfaces of the block.

11. The building block according to claim 9, wherein the first and second outer lateral surfaces are cut surfaces.

12. A building block able to receive loads comprising: a block of a cast material; means for transmitting light impinging on an outer surface of a first lateral side of the block to an outer surface of an opposite second lateral side of the block, wherein the means consists of a plurality of optical fibers that are embedded in the cast material and that each have a first end terminating at said outer surface of said first lateral side and a second end terminating at said outer surface of said opposite second lateral side of the block; said fibers defining a plurality of layers so that in each layer, the fibers are evenly spread and extend longitudinally in a direction parallel to each other and substantially fill the cross sectional volume of said building block between said first and second lateral sides.

13. The building block according to claim 12 wherein said first and second lateral sides extend transverse to a longitudinal axis of the block and are end surfaces of the block.

14. The building block according to claim 12 wherein the first and second lateral sides have cut outer surfaces.

\* \* \* \* \*